(12) United States Patent
Marquardt

(10) Patent No.: US 10,396,686 B2
(45) Date of Patent: Aug. 27, 2019

(54) CONVERTER INCLUDING MULTIPLE CONTROLLABLE TWO-POLE SUBMODULES CONNECTED IN SERIES

(71) Applicant: Rainer Marquardt, Riemerling (DE)

(72) Inventor: Rainer Marquardt, Riemerling (DE)

(*) Notice: Subject to any disclaimer, the term of this patent is extended or adjusted under 35 U.S.C. 154(b) by 0 days.

(21) Appl. No.: 15/562,813

(22) PCT Filed: Mar. 30, 2016

(86) PCT No.: PCT/EP2016/056860
§ 371 (c)(1),
(2) Date: Sep. 28, 2017

(87) PCT Pub. No.: WO2016/156356
PCT Pub. Date: Oct. 6, 2016

(65) Prior Publication Data

US 2018/0109202 A1    Apr. 19, 2018

(30) Foreign Application Priority Data

Apr. 2, 2015 (DE) .......................... 10 2015 105 159
Apr. 22, 2015 (DE) .......................... 10 2015 106 196

(51) Int. Cl.
*H02M 7/797* (2006.01)
*H02M 7/483* (2007.01)
(Continued)

(52) U.S. Cl.
CPC .......... *H02M 7/797* (2013.01); *H02J 7/0014* (2013.01); *H02J 7/0024* (2013.01); *H02M 7/483* (2013.01);
(Continued)

(58) Field of Classification Search
CPC ................ H02M 7/797; H02M 7/483; H02M 2001/0048; H02M 2007/4835
See application file for complete search history.

(56) References Cited

U.S. PATENT DOCUMENTS 8,890,465 B2   11/2014  Marquardt et al.
9,634,601 B2    4/2017  Kessler et al.
(Continued)

FOREIGN PATENT DOCUMENTS

DE    102013205562 A1    10/2014

OTHER PUBLICATIONS

International Search Report dated Jun. 23, 2016 for International Application No. PCT/EP2016/056860.
(Continued)

*Primary Examiner* — Gustavo A Rosario-Benitez
*Assistant Examiner* — Lakaisha Jackson
(74) *Attorney, Agent, or Firm* — Eschweiler & Potashnik, LLC

(57) ABSTRACT

A converter comprises a plurality of controllable two-pole sub-modules connected in series. At least some of the sub-modules each comprises a first and a second sub-module connection, a first, a second, a third and a fourth controllable switch, and a storage dipole, which comprises a first and a second dipole connection, an energy store and a controllable switching device, wherein the controllable switching device has a first selectable switching state, in which the storage dipole outputs no energy, and a second selectable switching state, in which the store of the storage dipole can take up or discharge energy. The sub-module has a selectable conduction state, in which the controllable switching device of the storage dipole assumes the first switching state and the first to fourth switches are switched such that a current flows through the sub-module on two parallel branches.

24 Claims, 11 Drawing Sheets

(51) Int. Cl.
*H02J 7/00* (2006.01)
*H02P 9/00* (2006.01)
*H02P 25/16* (2006.01)
*H02M 1/00* (2006.01)

(52) U.S. Cl.
CPC .............. *H02P 9/006* (2013.01); *H02P 25/16* (2013.01); *H02M 2001/0048* (2013.01); *H02M 2007/4835* (2013.01); *Y02B 70/1491* (2013.01)

(56) References Cited

U.S. PATENT DOCUMENTS

| | | | |
|---|---|---|---|
| 2013/0049659 A1* | 2/2013 | Marquardt | H02M 7/797 318/400.23 |
| 2015/0124506 A1* | 5/2015 | Sahoo | H02M 5/225 363/126 |
| 2016/0268915 A1* | 9/2016 | Lin | H02M 1/32 |
| 2017/0025866 A1* | 1/2017 | Goetz | H02M 1/32 |
| 2017/0358999 A1* | 12/2017 | Geske | H02M 7/219 |
| 2018/0166994 A1* | 6/2018 | Dorn | H02H 9/04 |

OTHER PUBLICATIONS

International Preliminary Report on Patentability dated Oct. 12, 2017 for International Application No. PCT/EP2016/056860.

* cited by examiner

CONVERTER INCLUDING MULTIPLE CONTROLLABLE TWO-POLE SUBMODULES CONNECTED IN SERIES

This Application is a National Phase Entry claiming priority to PCT Application number PCT/EP2016/056860 filed on Mar. 30, 2016, which claims priority to German Application number 10 2015106 196.1 filed on Apr. 22, 2015, which claims priority to German Application number 10 2015 105 159.1 filed on Apr. 2, 2015. The contents of the above-referenced matters are hereby incorporated by reference in their entirety.

FIELD OF THE INVENTION

The present invention is in the field of converters for converting electrical energy. In particular, it relates to a converter which comprises a plurality of controllable two-pole submodules connected in series, an associated submodule and a method for controlling such a converter.

BACKGROUND AND RELATED PRIOR ART

The low-loss conversion of electrical energy by means of suitable power-electronics converters is gaining increasing significance, even for high power levels. Important application areas include high-voltage direct-current transmission (HVDC) and large-scale drives with electronic speed/torque control. In terms of circuitry,—since the development of highly suitable, switchable power semiconductor switches—the most widely established are V converters that are known in the (English-language) literature as Voltage Source Converters.

A particularly advantageous variant is disclosed in DE 1010 3031 A1 and designated as a modular multi-level converter. FIG. 1 shows the structure of a modular multi-level converter 1 from the prior art, taken from DE 10 2009 057 288 A1. The converter 1 has power semiconductor valves 2 or branches, that are connected to each other in a bridge circuit. Each of the power semiconductor valves 2 extends between an AC voltage connection $L_1$, $L_2$, $L_3$ and a DC voltage connection $3_1$, $3_2$, $3_3$ or $4_1$, $4_2$, $4_3$. The DC voltage connections $3_1$, $3_2$, $3_3$ are connectable via a positive pole connection 5 to a positive pole and via a negative pole connection 6 to a negative pole of a DC voltage network (not shown).

The AC voltage connections $L_1$, $L_2$, $L_3$ are in each case connected to the secondary winding of a transformer, whose primary winding is connected to an AC voltage network (also not shown). For each phase of the AC voltage network an AC voltage connection $L_1$, $L_2$, $L_3$ is provided. In the designated prior art the converter 1 is part of a high-voltage DC transmission system and is used for connecting AC voltage networks in order to transmit high electrical power levels between them. Such a converter 1 can also be part of a so-called FACTS system, which is used for network stabilization or for ensuring a desired voltage quality, or can be used in drive technology. The switches in the individual submodules 7 can be controlled by a control device 60. For the sake of the clarity, the control lines between the control unit 60 and the individual submodules are not shown in FIG. 1.

As can also be seen from FIG. 1, the multi-level converter 1 is constructed in a strictly modular fashion from submodules 7, which essentially have two power connections or interfaces to the outside. Different variants of the internal circuitry of such submodules 7 are known in the prior art.

The simplest circuit variant is the so-called half-bridge submodule, which is already known from the above-mentioned patent document DE 1010 3031 A1 and is shown in FIG. 2. Such a half-bridge submodule has the smallest power loss for a given power and like semiconductor expenditure. The minimization of the power loss in the high-power range is of great economic and technical importance.

Instead of a half-bridge module, a full-bridge-submodule can also be used in modular multilevel converters, as is shown in FIGS. 3 to 5 in different switching states. As can be seen in FIGS. 3 to 5, the full-bridge submodule contains four semiconductor switches 10, 30, 10a and 30a, each of which has a reversed free-wheeling diode connected to it in parallel. The switches 10 and 30 form a first half-bridge and the switches 10a and 30a form a second half-bridge. Each full-bridge submodule has a first and a second terminal $X_1$ and $X_2$ respectively. The term "terminal" is intended in a purely functional sense and does not mean that the submodule necessarily actually comprises removable connections or clamps. This means that even if a plurality of modules is permanently connected, the inputs and/or outputs of the individual modules in this disclosure are designated as "terminals". The full-bridge submodule also comprises a capacitor as an energy storage device.

FIG. 3 shows a case in which the voltage $U_x$ between the second and the first terminal $X_2$, $X_1$ is zero ($U_x=0$) and a positive terminal current $I_x>0$ (technical current direction) flows.

FIG. 4 shows a switching state of the same submodule which has been activated with a positive supply voltage $U_x>0$, which—apart from the small forward voltage of the semiconductors—is equal to the positive voltage of the capacitor.

FIG. 5, like FIG. 3, shows a state with a negligible voltage between the terminals ($U_x=0$), but which is implemented by an alternative switching state of the semiconductor switches. Both in the switching state of FIG. 3, and in the switching state of FIG. 5, a current $i_x$ can flow through the submodule without the capacitor 9 absorbing (i.e. receiving) or delivering energy. An advantageous control method for this state could provide for the switching states according to FIG. 3 and FIG. 5 being activated alternately, in order to distribute the resulting transmission power loss over all four semiconductor switches 10, 10a, 30, 30a. This can certainly reduce the average semiconductor temperature, but does not achieve a significant reduction in the power loss of the submodule as a whole. The transmission voltage of the submodule in each switching state is given by the sum of the transmission voltages of two semiconductors, through which the full terminal current $i_x$ flows.

It is therefore evident that, both in terms of the number of semiconductor switches to be installed and in terms of the power loss, the full-bridge submodule of FIGS. 3 to 5 is less favourable than the half-bridge submodule of FIG. 2. However, these disadvantages are countered by the following advantages of modular multi-level converters with full-bridge-submodules:

a) the DC current at the DC terminals of the converter can be electronically switched off, for example in the event of DC short-circuits, b) the DC voltage at the DC terminals can be continuously adjusted between a positive maximum value and a negative maximum value of equal amplitude, independently of the AC voltage, and c) the capacitance of the capacitors in the submodules can be dimensioned significantly smaller, because the power polarization is inherently lower.

As a kind of intermediate solution between the half-bridge and full-bridge submodule, a submodule has been proposed in DE 10 2009 057 288, which is reproduced in FIG. 6. The submodule of FIG. 6 also offers the advantage mentioned in (a) above, that the DC current can be electronically switched off, and in comparison to converters with full-bridge submodules, allows a reduction in the power loss of up to 25%. However, the advantages listed under (b) and (c) above cannot be achieved. A further restriction exists with regard to the maximum value of the negative DC voltage, which can only reach half the value compared with that of the full-bridge submodules.

An extension to the submodules known from DE 10 2009 057 288 A1 and shown in FIG. 6 by two additional semiconductor switches is specified in the following doctoral thesis from the Swedish Research Institute KTH: K. Ilves, "Modeling and Design of Modular Multilevel Converters for Grid Applications", Doctoral thesis, KTH Royal Institute of Technology, Stockholm, Sweden, TRITA-EE 2014:045, ISSN 1653-5146, urn:nbn;se:kth:diva-153762.

The version designated in the aforementioned thesis as a "semi-fullbridge submodule" essentially enables criterion (b) to be satisfied. But there is still a restriction on the attainable maximum value of the negative DC voltage, which continues to reach only the value according to DE 10 2009 057 288 A1 and FIG. 6. Furthermore, there exist disadvantages with regard to criterion c), because switching states with direct parallel connection of the two storage capacitors present in the same submodule are permitted only to a very limited extent. At high voltages, a direct parallel connection of capacitors, as is known to the person skilled in the art, leads to short-circuit-like DC compensation currents and inherent energy losses.

DE 10 2013 205 562 discloses an energy storage device which is designed to deliver and/or absorb electrical energy in the form of an n-phase current and an n-phase voltage, where n>1. The energy storage device comprises n energy supply branches, each of the energy supply branches having a plurality of energy storage modules connected in series. The energy storage modules each comprise an energy storage cell coupling module with coupling module connectors, and a coupling device with coupling elements, which are designed to selectively switch the energy storage cell module via the coupling module connectors into the respective energy supply branch or to bypass the respective power supply branch. Each of the energy storage cell coupling modules in turn has a coupling module strand with a plurality of series-connected energy storage cell branch modules, which comprise an energy storage cell branch with a series circuit comprising an energy storage cell branch coupling element and at least one energy storage cell, and a bypass-branch coupling element connected in parallel with the energy storage cell branch.

SUMMARY OF THE INVENTION

The object of the present invention is to provide a converter which provides the full range of functionality in the three given criteria (a), (b) and (c), as does a multi-level converter with full-bridge submodules, but at the same time allowing a reduction in the power loss.

This object is achieved by a converter according to claim 1, an associated submodule according to claim 23 and an associated control method according to claim 25. Advantageous further developments are specified in the dependent claims.

The converter according to the invention comprises, as known from multi-level converters, a plurality of controllable two-pole submodules connected in series, wherein at least some of said submodules in each case comprise the following:
  a first and a second submodule terminal,
  a first, a second, a third and a fourth controllable switch, and
  a first storage two-pole (also referred to as "two-terminal-device"), which comprises a first and a second two-pole terminal, an energy store and a controllable switching device, wherein the controllable switching device
    has a first activatable switching state in which the first storage two-pole delivers no energy irrespective of a voltage applied between the first and the second storage two-pole terminal, and
    has a second activatable switching state in which the store of the first storage two-pole can absorb or deliver energy.

The "first" storage two-pole can be the only storage two-pole of the submodule. There are also preferred embodiments, however, which contain at least two such storage two-poles, as described in more detail below. In order to obtain a consistent nomenclature, a single existing storage two-pole is therefore also designated as a "first storage two-pole".

Preferably, the submodules according to the invention only comprise the said two terminals. In the preferred embodiments, it is not intended that the energy stores of different submodules are connected in parallel, which would require four submodule terminals.

The submodule as a whole has an activatable transmission state in which
  the controllable switching device of the storage two-pole occupies the first said switching state, and
  the first to fourth switches are connected in such a way that a current can flow through the submodule on two parallel branches.

The transmission state functionally replaces the switching states of FIG. 3 and FIG. 5, which can be alternately activated. In both cases the entire current flows through two switches, more precisely through one switch and through a free-wheeling diode in parallel with a switch. However, the forward voltages of the diodes do not in general differ significantly from those of the controllable semiconductor switches. A similar situation applies to modifications in which the semiconductors themselves are reverse-conducting. This means that the losses in both conducting directions are always at a similarly high level. For this reason, for the sake of a simpler description, the term "switch" will be understood to mean either a reverse-conducting switch or pars pro tow, a unit comprising a non-conducting reverse-conducting switch and a reversed free-wheeling diode connected in parallel.

In the converter of the invention on the other hand, the submodule as a whole can occupy the said activatable transmission state in which the switches are connected in such a way that the current can flow through the submodule on two parallel branches, wherein each of the two branches then in particular contains two switches. In semiconductors with an Ohmic forward characteristic, such as in the case of field effect transistors, this leads to a particularly significant reduction in power loss. The power loss of the submodule in this switching state is reduced by 50% compared to each of the switching states of FIG. 3 and FIG. 5. For the typical forward characteristic of IGBT transistors this results in a somewhat lesser advantage, which is determined by the specific non-linearity of the forward characteristic, but in any case still a very substantial efficiency gain.

It is important to note that the described transmission switching state is not possible with the conventional full-bridge submodule of FIGS. 3 to 5, because then the capacitor is short-circuited. By way of deviation from this, the invention provides a storage two-pole with energy storage and a controllable switching device, which has the said first activatable switching state in which the two-pole delivers no energy irrespective of a voltage applied between the first and the second storage two-pole terminal, so that said activatable transmission state can be obtained with two parallel current branches. The first switching state of the storage two-pole need not exclude the possibility that the storage two-pole absorbs energy, i.e. is charged. The store of the storage two-pole need therefore not be completely decoupled from the rest of the submodule. It is sufficient for the purposes of the invention that a discharge current of the storage two-pole is prevented in the first switching state.

It is important to note that the person skilled in the art would nevertheless at first sight not expect any reduction in the net power loss in operation due to this measure, because the described reduction of the power losses only relates to one of the switching states, namely a switching state in which current flows through the submodule and no voltage ($U_X=0$) is present between the terminals of the submodule (neglecting the small voltage drop at the switches). In all the switching states in which the energy store of the storage module either absorbs or delivers energy, the switches of the switching device of the storage two-pole introduce additional losses that are not present in the case of the simple full-bridge submodule of FIGS. 3 to 5. The person skilled in the art would thus at first sight not expect that this would result in significant net performance savings, and would also be put off by the costs of the additional switching device and the increased control complexity. In fact, developments in the state of the art for the purpose of reduction of power losses actually took a different direction, as described in the above patent DE 10 2009 057 288 A1 and the above-mentioned thesis by K. Ilves.

It is also important to note that full-bridge circuits if they are not used—as in the present invention—as submodules of a modular multilevel converter, are traditionally used and operated for the following two purposes:

I. For the transfer of active power. In this case, a DC-side infeed source or energy consumption-enabled load is connected in parallel with the capacitor and necessary,
II. for the compensation of reactive power (only). In this case, a DC-side infeed source in parallel with the capacitor is not necessary, but no transfer of active power is possible either.

The use of a storage two-pole according to the invention in the conventional applications of full-bridge circuits is therefore not helpful for the reduction of the power loss, and to the knowledge of the inventor was therefore also correctly not taken into consideration in the prior art. Because in the first mentioned case I—due to the transmission of active power—the fundamental oscillations of the output-side, i.e. AC-side, currents and voltages are essentially in phase. Time segments with high amplitude output current therefore coincide with the time segments of high output voltage amplitude. The latter must be implemented by a high temporal proportion of the switching states with $U_X=+U_C$ (or $U_X=-U_C$ in the negative half-wave) and with a relatively small proportion of the switching states with $U_X=0$, where $U_C$ is the voltage of the storage capacitor. It would therefore not be appropriate to reduce the transmission voltage only in the switching states with $U_X=0$ as in the context of the invention. Furthermore, the DC-side infeed source, as already mentioned above, would be short-circuited in these switching states.

In the second case II the fundamental oscillations of the output-side (AC-side) currents and voltages are phase shifted relative to each other by approximately 90°. Known application cases for the full bridge here are reactive power compensation systems, known in the (English) literature as STATCOM, which cannot transfer any active power components at all. Here also, time segments with a high output current amplitude coincide with time segments with a high output voltage amplitude, but at least the absolute peak values of current and voltage no longer occur simultaneously, which alleviates the problems at least to some degree. Here too, it would not be appropriate to use a storage two-pole in accordance with the invention.

Contrary to these prejudices in the technology of the prior art, however, it is surprisingly found that under the special boundary conditions such as are specifically found for a submodule in a modular multi-level converter, the power losses can nevertheless be reduced by a considerable extent overall. This is revealed only after a comprehensive analysis and more in-depth understanding of the boundary conditions which apply specifically in a modular multilevel converter, and which will be described in greater detail in connection with the description of the preferred exemplary embodiments. It turns out that when the submodules according to the invention are used in a multilevel converter structure, not only are all of the above three criteria (a), (b) and (c) satisfied, but the power loss can also be kept significantly lower than with a conventional full bridge according to FIGS. 3 to 5, and even lower than in the use of the submodule from DE 10 2009 057 288 (FIG. 6), and this also being achieved with potentially lower construction costs, depending on the design of the storage two-pole.

In an advantageous further development the converter comprises a control unit, which is designed to control the switches of the submodule and the switching device of the first storage two-pole, wherein the control unit is configured to switch selected submodules selectively into the transmission state.

The submodule preferably has one or a plurality of the following four activatable energy delivery or energy-absorbing states, in which in each case the controllable switching device of the first storage two-pole occupies the said second switching state, and
1. the voltage between the second and the first submodule terminal is positive and the store of the first storage two-pole is charged, or
2. the voltage between the second and the first submodule terminal is positive and the store of the first storage two-pole is discharged, or
3. the voltage between the second and the first submodule terminal is negative and the store of the first storage two-pole is discharged, or
4. the voltage between the second and the first submodule terminal is negative and the store of the first storage two-pole is charged.

In a preferred embodiment, the first and the second switches are connected in series and the third and fourth switches are connected in series. The first and second switches thus form a first half bridge, and the third and fourth switches form a second half-bridge. The first and the second half-bridge are then connected in parallel with the first storage two-pole.

Preferably, a potential point between the first and second switch is connected to the first submodule terminal, and a potential point between the third and fourth switch is connected to the second submodule terminal. The first and the second switch are preferably oriented in the same direction in terms of their forward direction, and the third and fourth switch are oriented in the same direction in terms of their forward direction. Preferably, the first and the second switch are oriented opposite to the third and fourth switch in terms of their forward direction.

In an advantageous further development, at least some of the said submodules further comprise the following:
a fifth, sixth, seventh and eighth controllable switch, wherein the fifth controllable switch is connected directly in parallel with the fourth controllable switch and can optionally be omitted, and
a second storage two-pole, which comprises a first and a second two-pole terminal, an energy store and a controllable switching device, wherein the controllable switching device
  has a first activatable switching state, in which the second storage two-pole delivers no energy irrespective of a voltage applied between its first and its second storage two-pole terminal, and
  a second activatable switching state, in which the store of the second storage two-pole can absorb or deliver energy,
  wherein the submodule as a whole has an activatable transmission state, in which
    the controllable switching device of the first and second storage two-pole occupy the said first switching state, and
    the first to eighth switches are connected in such a way that a current can flow through the submodule on two parallel branches.

Compared to the simple variant with only one storage two-pole, such a submodule with at least two storage two-poles and at least 8 or 7 (if the fifth switch is omitted) controllable switches allows a further loss reduction of typically 20% to 25%, and apart from a lower negative maximum voltage shows no technically significant limitations of function.

Herein, the fifth and sixth switch are preferably connected in series, the seventh and eighth switch are connected in series and the series connection consisting of the fifth and the sixth switch, the series connection consisting of the seventh and eighth switch and the second storage two-pole are connected in parallel. If the fifth switch is omitted, in the present disclosure the fourth switch replaces the fifth switch.

In an advantageous further development, a potential point between the first and second switch is connected to the first submodule terminal, a potential point between the third and fourth switch to the first terminal of the second storage two-pole, a potential point between the fifth and the sixth switch to the second terminal of the first storage two-pole, and a potential point between the seventh and the eighth switch to the second submodule terminal.

The fifth and the sixth switch are preferably oriented in the same direction in terms of their forward direction, and the seventh and eighth switch are preferably oriented in the same direction in terms of their forward direction. Furthermore, the fifth and the sixth switch are preferably oriented opposite to the seventh and eighth switch in terms of their forward direction.

In an advantageous embodiment, one or more of the first to the fourth switch are formed by power semiconductors, in particular by IGBTs or thyristors, in particular GTO thyristors. One or more of the first to the fourth switches is or are preferably formed by reverse-conducting power semiconductors. Alternatively, one or more of the first to the fourth switches can have a reverse parallel connected free-wheeling diode. This is shown in more detail below on the basis of exemplary embodiments.

In an advantageous for the development, the control unit is configured to switch a switch into conduction also in switching states in which a current flows in the opposite direction to this switch. This allows the forward voltage, in particular in the case of field-effect transistors (FETs), to be further reduced. In an advantageous further development, the converter comprises a plurality of branches or valves comprising submodules connected in series, wherein each branch has at least 3, preferably at least 6 of the said submodules. In many practical applications however, one branch of the modular multilevel converter contains more than 50, more than 100 or even several hundred such submodules.

In an advantageous for the development, the store of the storage two-pole comprises at least one capacitor, in particular a unipolar capacitor. The store preferably comprises at least two capacitors, which are or can be connected in series. In particular, the at least two capacitors can be connected in parallel for charging and in series for discharging. In an advantageous further development, the switching device of the storage two-pole comprises at least one semiconductor switch whose percentage power loss is less than that of the first to fourth switch. This is possible because, especially in modular multilevel converter applications, the currents that flow in the switches of the switching device of the storage two-pole are substantially lower than the currents which flow through the individual submodules, for example, in the transmission state. This opens up the possibility of using particularly low-loss semiconductor switches for the switching device of the storage two-pole, in particularly SiC-switches or GaN-switches.

DESCRIPTION OF THE PREFERRED EMBODIMENTS

Figure 1:
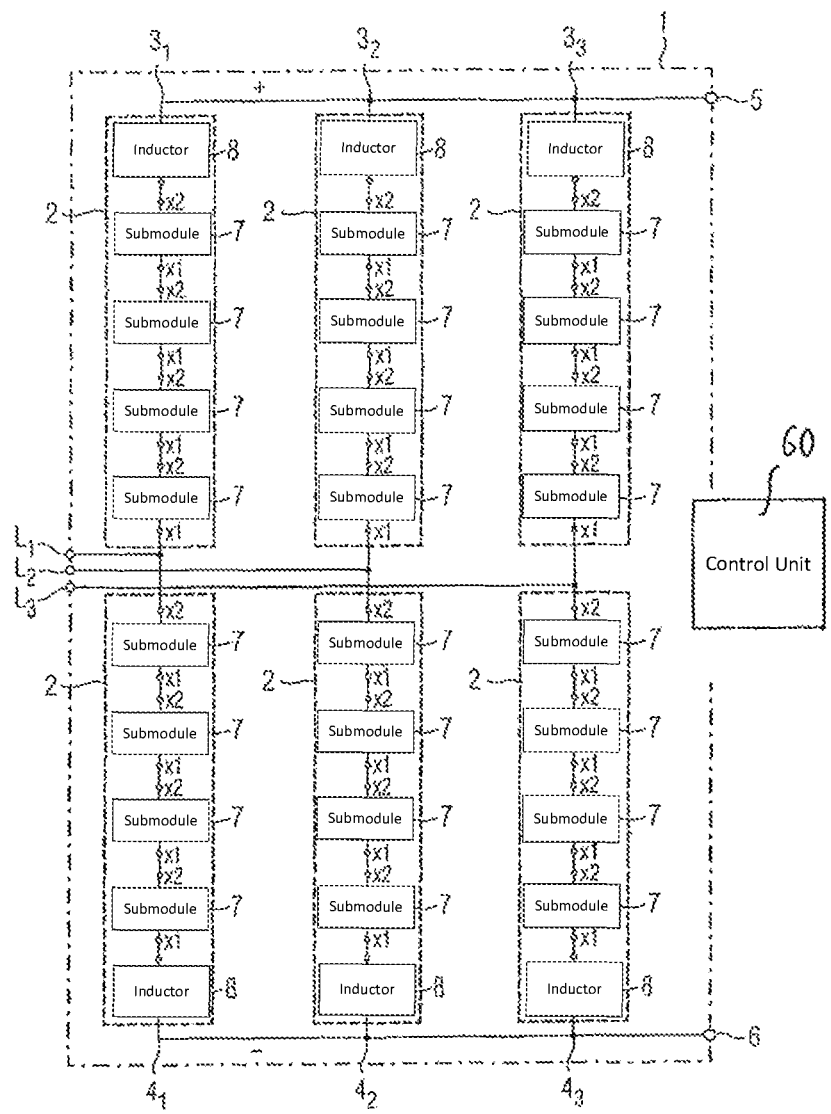
FIG. 1 shows a schematic structure of a modular multilevel converter structure.
Figure 2:
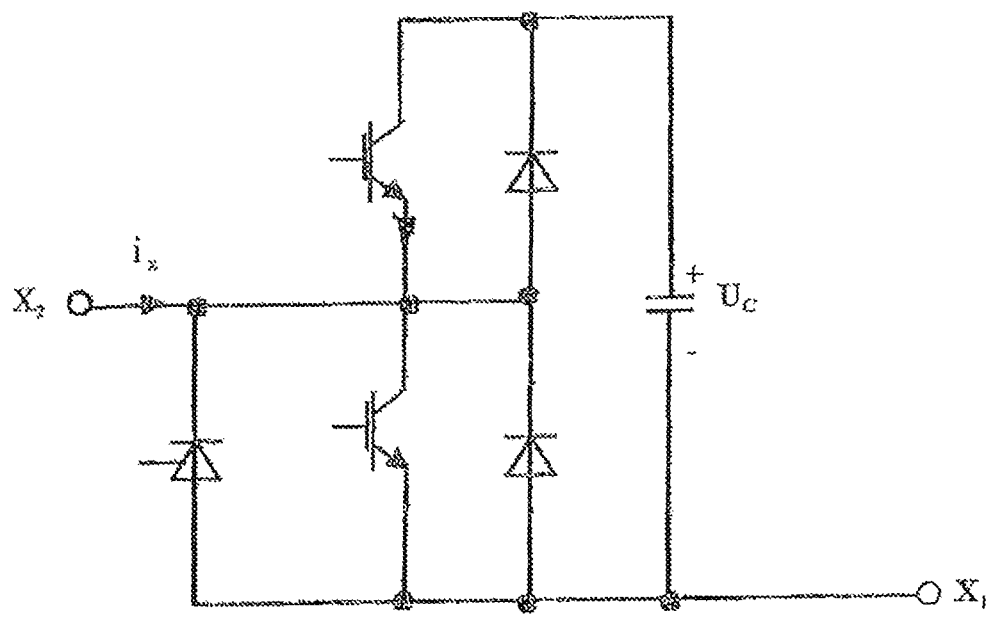
FIG. 2 shows a submodule with a half-bridge circuit.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

Figure 7:
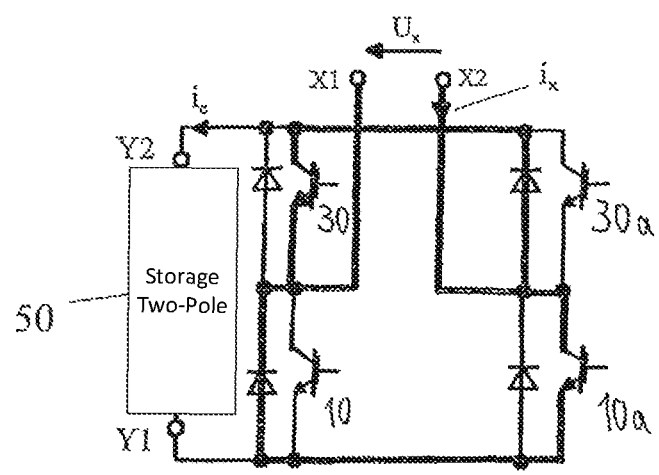
FIGS. 7-10 show a submodule according to one embodiment of the invention in different switching states.

FIG. 7 shows an exemplary embodiment of a submodule 20 for a converter according to an embodiment of the invention. The submodule according to the invention can be used in a modular multilevel converter topology in the same way as shown in FIG. 1, and can thus replace the submodules 7. The submodule 20 comprises a first and a second submodule terminal X1, X2, a first controllable switch 10, a second controllable switch 30, a third controllable switch 10a and a fourth controllable switch 30a, which in the exemplary embodiment shown are formed by power semiconductors. In the embodiment illustrated, the first to the fourth controllable switches 10 to 30a are not reverse-conducting. Instead, each of the first to the fourth switch 10 to 30a is connected in parallel with a freewheeling diode in the reverse direction. Finally, the submodule 20 comprises a storage two-pole 50, which has a first and a second two-pole terminal Y1, Y2.

Different configurations of such a storage two-pole 50 are shown in FIGS. 13 to 17 and are described below. Common to all these embodiments of the storage two-pole, however, is the fact that they comprise an energy store, which in the exemplary embodiments shown below is formed by one or more capacitors, and a controllable switching device, and that the controllable switching device has a first activatable switching state in which the storage two-pole delivers no energy irrespective of a voltage applied between the first and the second storage two-pole terminal, and has a second controllable switching state in which the store of the storage two-pole absorb can absorb or deliver energy.

The overall result achieved thereby is that the submodule as a whole can assume an activatable transmission state which is shown in FIG. 7, where again the current flow is illustrated by the greater line thickness. In this transmission state, the controllable switching unit of storage two-pole 50 occupies the said first switching state, so that th a e storage two-pole delivers no energy. The voltage $U_X$ between the terminals X1 and X2 of the submodule 20 in the switching state of the module 20 shown is zero overall ($U_X=0$), with the exception of a low forward voltage, i.e. a voltage which is dropped across the semiconductor switches 10a and 30a, or the diodes connected in parallel with the semi-conductors 10 and 30, when a current flows. As can also be seen in FIG. 7, the first to the fourth switches 10 to 30a are connected in such a way that a current $i_x$ flows through the submodule 20 in two parallel branches, namely on a first branch through the third switch 10a and the free-wheeling diode of the first switch 10, and on a second branch through the free-wheeling diode of the fourth switch 30a and the second switch 30.

Figure 3:
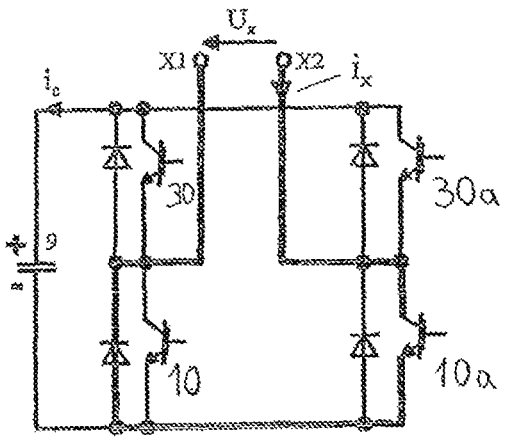
FIGS. 3-5 show a full-bridge submodule in different switching states.
Figure 5:
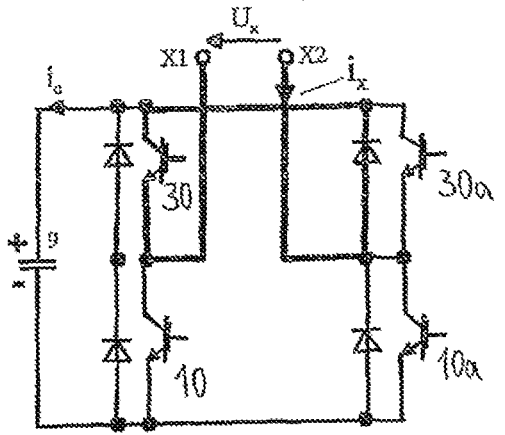
Figure 6:
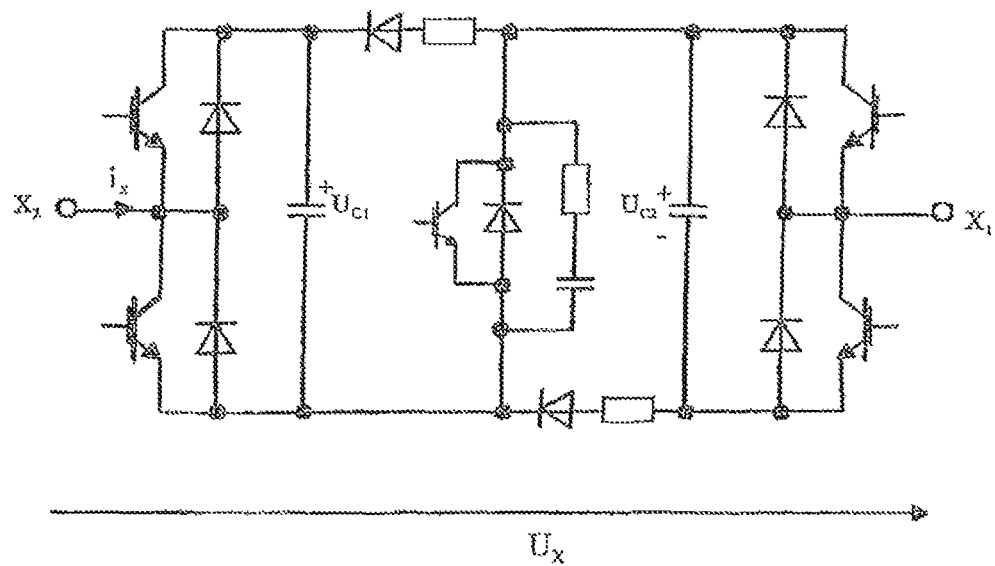
FIG. 6 shows a submodule from the prior art, which is designed for reducing the power loss.

For a given current $i_x$, this means that through each switch or each diode, only half as much current flows than in the switching states of FIG. 3 or FIG. 5. If it is further assumed that the semiconductors have an Ohmic forward characteristic, as is the case for example in field effect transistors, then this also means that across the switches only half the voltage is dropped, so that the total power loss of the submodule, compared with the situation of FIG. 3 or FIG. 5, and for the same total current $i_x$, is halved. For typical forward characteristics of IGBT transistors a somewhat lesser advantage results, but one that is still substantial.

FIG. 7 shows a forward condition for the case where $U_X$ (except for the forward voltage) is equal to zero ($U_X=0$) and the current flow $i_X$ is greater than zero ($i_X>0$). This switching state is designated in the following description by Z=5.

Figure 8:
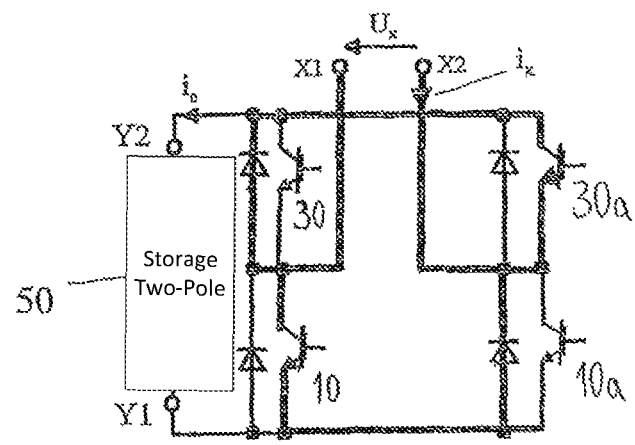

FIG. 8 shows a further transmission state in which $U_X$ (except for the forward voltage) is also zero ($U_X=0$), but the forward current $i_X$ is negative ($i_X<0$), thus the current direction is reversed. This switching state is designated in the following as Z=6.

Figure 9:
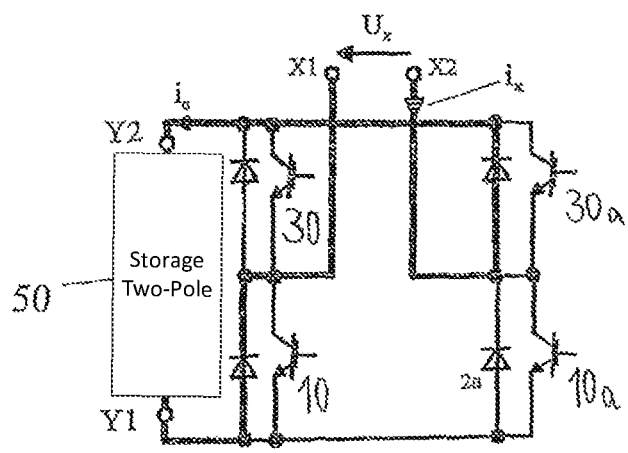

FIG. 9 shows the submodule 20 of FIG. 7 in a further switching state, in which the controllable switching device of the storage two-pole and the first to fourth switches 10 to 30a are connected in such a way that the voltage between the second and the first submodule terminal X2, X1 is positive and a positive current flows into the storage two-pole 50, so that the store of the storage two-pole is charged. This switching state is designated below as Z=1.

Figure 10:
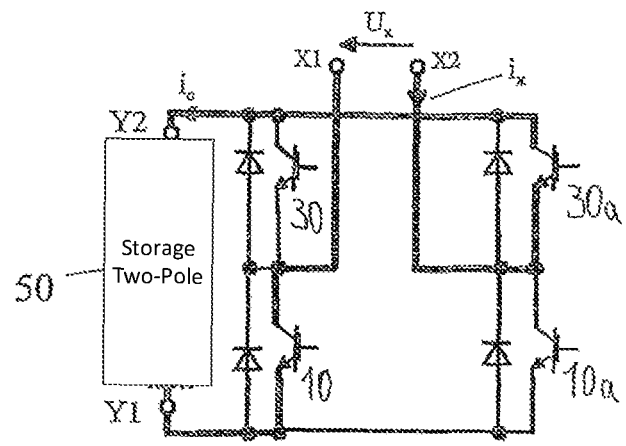

FIG. 10 shows the submodule 20 of FIG. 7 in a switching state in which the voltage between the second and the first submodule terminal X2, X1 is likewise positive, but both the module current $i_X$ and the charging current of the storage module 50 are negative, the store of the storage two-pole 50 is therefore discharged. This condition is referred to below as Z=2.

Finally, the submodule 20 of FIG. 7 has two more switching states that are not explicitly shown, namely a state Z=3, where the voltage between the second and the first submodule terminal X2, X1 is negative ($U_X<0$) and the store of the storage two-pole 50 is discharged ($i_c<0$), and a state Z=4, in which the voltage between the second and the first submodule terminal X2, X1 is negative ($U_X<0$), and the store of the storage two-pole 50 is charged ($i_c>0$).

Figure 11:
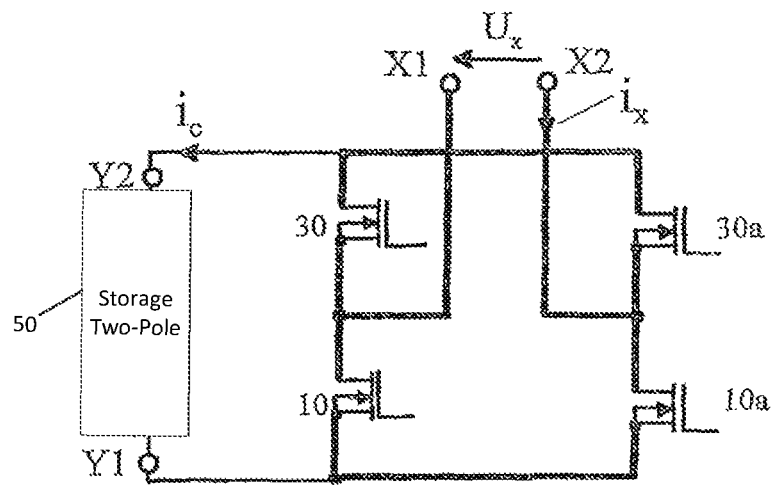
FIGS. 11-12 show a submodule according to another embodiment of the invention in different switching states.
Figure 12:
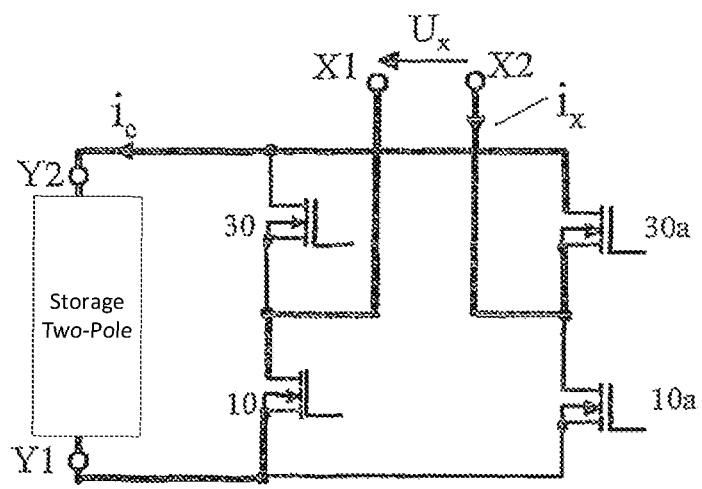

FIG. 11 shows a further variant of the submodule 20 in the switching state Z=5, wherein the submodule 20 is identical to that of FIGS. 7 to 9, except that instead of ordinary semiconductor switches and parallel-connected reverse diodes, reverse-conducting power semiconductors are used here. FIG. 12 shows the submodule 20 of FIG. 11 in state Z=1.

Figure 13:
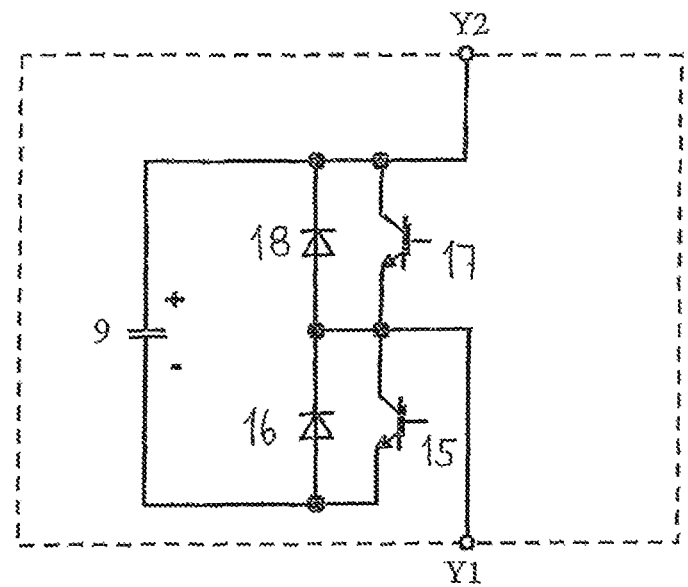
FIGS. 13-17 show embodiments of a storage two-pole.
Figure 14:
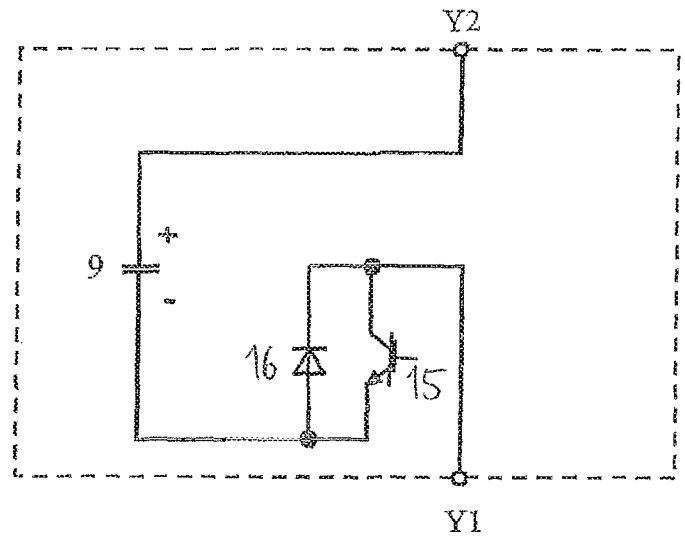
Figure 15:
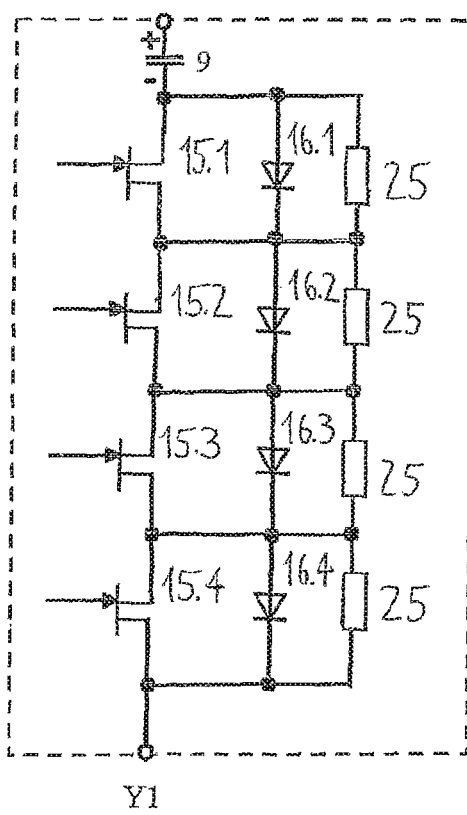

FIG. 13 to FIG. 17 show examples of different embodiments of the storage two-pole 50. Herein, FIG. 13 to FIG. 15 are embodiments which only contain one storage capacitor 9 as the energy store. The switches shown therein form the above-mentioned switching device, which is likewise activated by the control device 60 (see FIG. 1).

FIG. 14 is a particularly low-cost design. The semiconductor switches 15 and 16 shown therein, as already explained, can also be replaced by a reverse conducting semiconductor switch. If the controllable semiconductor switch 15 is switched off, the storage two-pole 50 is in its first state; if it is switched on, it is in its second state.

FIG. 13 has the same above-mentioned functionality, provided the controllable semiconductor 17 always remains switched off. However—after switching off the controllable semiconductor switch 15—it can also be switched on. This allows a significant reduction in the switching energy losses of the semiconductors 10, 30, 10a, 30a, since they can now be switched under zero-voltage conditions ("zero voltage switching").

In theory, this enables both the switch-on and the switch-off energies of these semiconductors to be avoided—in reality they are least substantially reduced. Because the invention offers the possibility of using semiconductors in a customized technology in the storage two-pole 50—which is loaded with only a low effective rms value of the current—, the "zero voltage switching" is also advantageous with regard to the overall power loss of the converter. Well-suited technologies for the storage two-pole 50 are e.g. field-effect transistors based on silicon carbide or gallium nitride, which have very low switching energy losses.

FIG. 15 shows a storage two-pole 50, which by way of example is equipped with a series circuit of a plurality of field-effect transistors 15.1 to 15.4 of silicon carbide. Optionally, diodes 16.1 to 16.4 are also provided, which in the case of reverse-conducting semi-conductors is not absolutely necessary. In addition, optional Ohmic resistors 25 are provided, which can improve the static voltage distribution of the series circuit in a known manner.

Such a design of storage two-pole 50 has further advantages:

The series connection of semiconductor switches with low voltage generally has much smaller switching energy losses than a semiconductor with correspondingly higher voltage rating.

The series connection of the semiconductor switches can be designed such that even in the event of a defect in a semiconductor it still remains functional. This is generally known and is used e.g. in the series connection of thyristors in converters for high-voltage direct current transmission. In the present context the advantage is obtained that an abrupt discharge of the storage capacitor 9 can be safely avoided, without all the semi-conductor switches 10, 30, 10a, 30a having to be implemented in a series circuit. An abrupt, short-circuit-like discharge of the storage capacitor is known to be extremely undesirable and dangerous, due to the resulting destruction of the semiconductors and their contacts and the shock and arcing effects.

Figure 16:
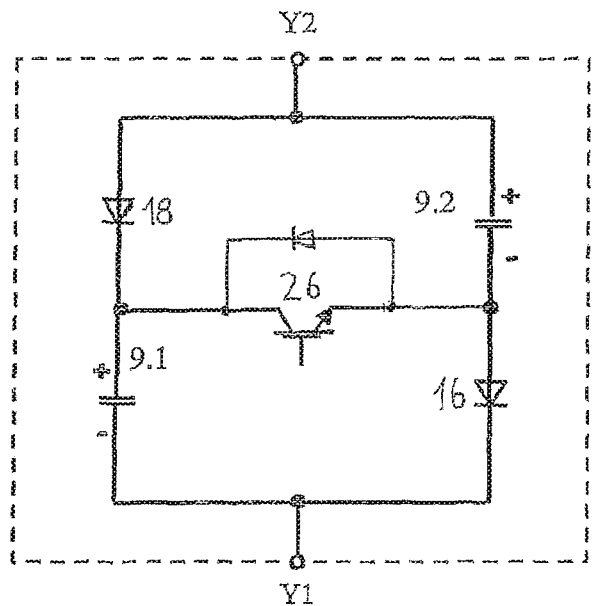

FIG. 16 shows a further possible embodiment of the storage two-pole 50, which contains two storage capacitors 9.1 and 9.2. If the controllable semiconductor switch 26 is switched off, the storage two-pole 50 is in the first state, and if it is switched on, in its second state. In this state the storage capacitors 9.1 and 9.2 are here connected in series—if the two-pole 50 is delivering energy. They are connected in parallel if the two-pole 50 is absorbing energy. In some applications it is advantageous if the two-pole 50 can absorb the highest possible energy amounts with a comparatively low voltage.

Figure 17:
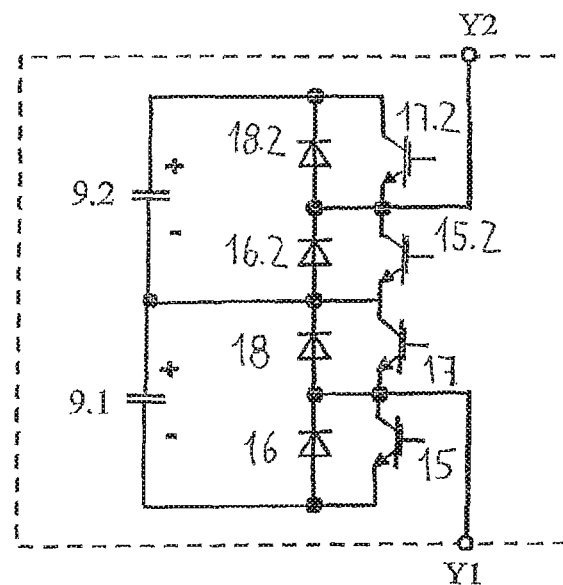

FIG. 17 shows a further embodiment of storage two-pole 50, which enables a so-called multilevel voltage or multi-point voltage $U_X$ of the associated submodule. Many types of connection of the power electronics are known, which can generate a multi-point voltage with more than three voltage levels. However, they still require a plurality of directly or indirectly series-connected semiconductor switches in the main branches of the converter. On the other hand however, it is sufficient and more advantageous to only use such a series connection in the storage two-pole 50, because that is where the effective value of the current is much lower. As a result of this, the resulting total power losses of the converter are also lower.

Figure 18:
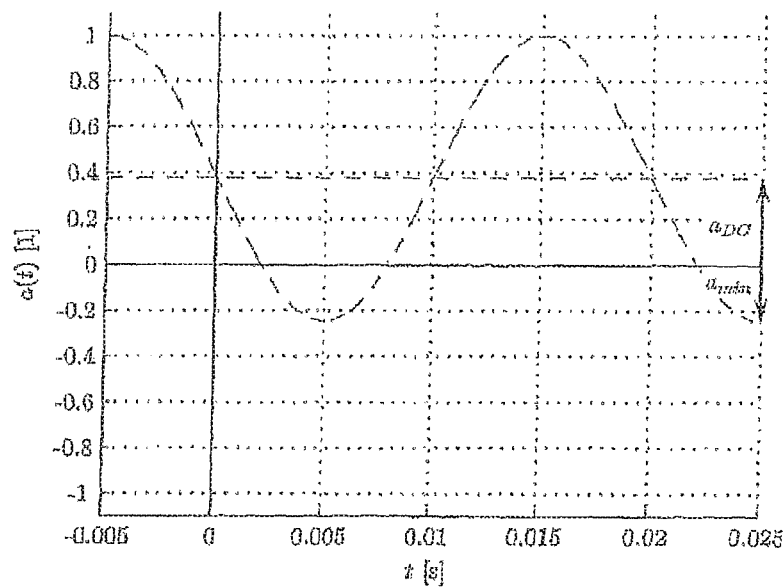
FIG. 18 shows a typical modulation index of the branch voltage of a modular multilevel converter.
Figure 19:
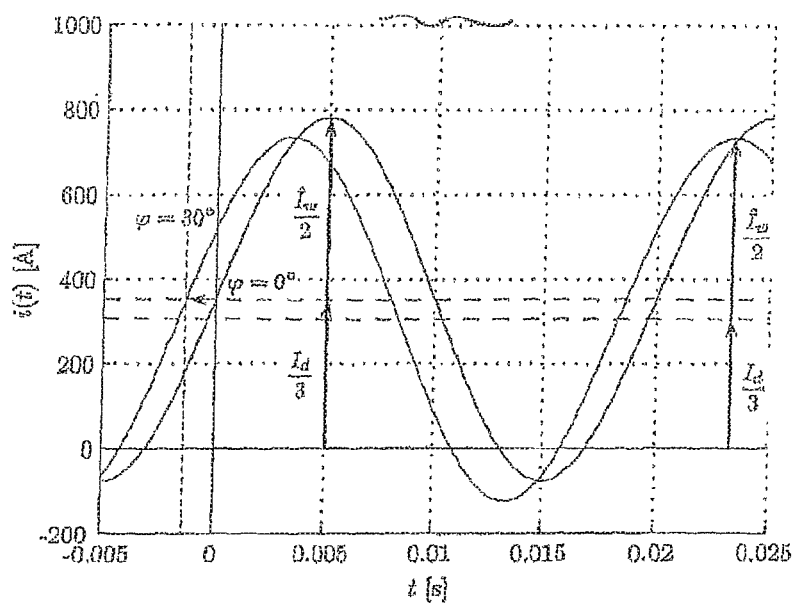
FIG. 19 shows the temporal progression of the branch current associated with the modulation index of FIG. 18.

With reference to FIGS. 18 and 19 it will now be explained that, for the specific use of the submodules 20 in a modular multilevel converter, boundary conditions apply which cause the quantitative advantage of the invention with regard to savings in power loss to be very much brought to bear. FIG. 18 shows the temporal progression of the modulation index a(t) for one of the six branches or valves 2 of the modular multilevel converter 1 of FIG. 1. The modulation index a is proportional to the branch voltage. The term "modulation index" is a standard term in the field of power electronics and is defined as follows:

Modulation index a=1 means that each of the submodules 20 of the branch 2 occupies the switching state $U_X$=+$U_C$, so that the positive maximum value of the branch voltage is reached.

Modulation index a=0 means that each of the submodules 20 of the branch 2 occupies the switching state $U_X$=0, so that the resulting branch voltage goes to zero.

Values between these two limits are set by the fact that both of the above switching states are switched alternately in temporal sequence with the appropriate relative frequency.

For negative branch voltages, mutatis mutandis negative modulation indices (a<0) must be set, wherein by analogy the switching states with $U_X$=−$U_c$ instead of $U_X$=+$U_c$ are used, and U=0 still being used as the second switching state.

FIG. 19 shows the temporal progression of the branch current i(t) of the same branch of the modular multilevel converter.

FIGS. 18 and 19 show a typical, realistic operating case of a modular multilevel converter in its nominal operation. It is characteristic that the nominal value $a_{DC}$ of the DC voltage that is set is chosen lower than in a modular multilevel converter populated with half-bridge submodules. Among other things, this has the advantage that the branch currents have a smaller proportion of alternating current.

High negative values of the branch voltage in the rated operation are in general not required. In the typical example shown, the usage of the maximum possible negative branch voltage is only approx. 20%, so that the average, temporal duration of the switched-on state with $U_X$=0 in the range of negative modulation indices (a<0) and branch voltages is above 80%. But this precisely corresponds to the transmission states of the submodule in which, as explained above, the comparatively large reduction in the power loss is obtained. This range, however, is where the highest currents occur (see FIG. 19), so that the advantage of the invention is very substantial.

Because in a modular multilevel converter the active power is not fed in or fed back on the DC side of the submodules (in parallel with the capacitor), but at the higher-level DC BUS (cf. reference numerals 5 and 6 of FIG. 1) of the converter, DC components are superimposed on the terminal currents and terminal voltages of the submodules (see also "Power electronics circuits", Springer Vieweg-Verlag, 3rd edition, ISBN 978-3-6 42-30103-2, Chapter 8.5.9, p. 748).

In general, the aim is to distribute the DC components evenly over the six branches of the modular multilevel converter, and evenly over the submodules 20 within the branches. The DC component of the modulation index and the voltage is then equal to half of the DC voltage of the converter, and the DC component of the current is equal to one third of the DC current of the converter ($L_d/3$, see FIG. 19), in the case of symmetrical distribution of the active power of the converter over the three phases of the three-phase system, as is shown in FIG. 1. This is the aim pursued in the nominal operation and can also be implemented in practice.

For reasons of an equalized charge balance of the storage capacitors of the submodules, and due to the law of energy conservation, which requires that the AC-side active power is equal to the DC power modulo the small converter power loss, the characteristics shown in FIGS. 18 and 19 are in fact typical of the operation of a modular multi-level converter with predominant transmission of active power. This applies both to the ideal case in which the current and voltage are in phase ($\varphi=0°$ in FIG. 19), but the conditions do not change significantly in the case of additional proportions of reactive power (e.g. $\varphi=30°$), which is also shown in FIG. 19.

By inverting the direction of energy flow (feedback instead of feeding in active power), both the sign of the direct current component ($I_d/3$) and that of the alternating current ($I_w/2$) are inverted. With regard to the forward or transmission power loss of the submodule, this is of no relevance, so that the benefits described are retained.

Figure 4:
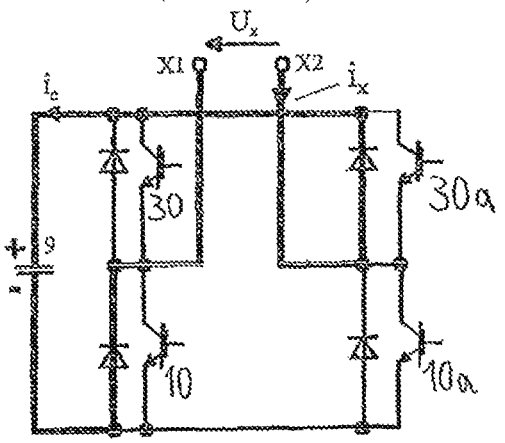

The achievable reduction in the mean forward power loss during nominal operation of the converter is dependent on the actual forward characteristic of the semiconductor switches used. For a purely Ohmic forward characteristic in both current directions (as is feasible inter alia for field-effect transistors), this results in a typical reduction of approximately 30% of the forward power losses—compared with modular multilevel converters which use full-bridge submodules as in FIGS. 3, 4 and 5. This is a surprising result, which is due to the special boundary conditions occurring in modular multilevel converter topologies.

In addition to the described reduction in the forward power loss, the invention also enables a reduction in the switching power loss. This will be explained using the Tables 1 to 6 given below, each of which contain the following variables:

A state designated Z, which characterizes a specific combination of submodule terminal voltage $U_x$, the sign of the submodule terminal current (sign $i_x$) and sign of the current at the terminals of the storage two-pole 50 (sign $i_C$). The supply voltage $U_x$ is normalized to the voltage $U_c$ of a capacitor contained in the storage two-pole and is therefore designated by $U_x/U_c$.

The sign of the current at the terminals of the storage two-pole 50 is defined so that a positive sign (sign $i_c=+1$) signifies an energy consumption and a negative sign (sign $i_c=-1$) signifies an energy output of the two-pole 50.

The currents $i_{10}$, $i_{10a}$, $i_{30}$ and $i_{30a}$ in the reverse-conducting semiconductor switches 10, 10a, 30, 30a (see FIGS. 11 and 12) are defined in such a way that positive signs designate the current directions that can be actively controlled by the control terminal or gate. Negative signs for the currents therefore mean that the anti-parallel diode structure of the semiconductor switch is conducting. The current flow in this case cannot be controlled by the gate. As has already been mentioned, a switching-on signal can nevertheless be present at the control terminal. This is useful when—as is the case in general for field-effect transistors—it reduces the forward voltage, or if the sign of the current measurement cannot be reliably detected by measurement.

The currents of the semiconductor switches $i_{10}$, $i_{10a}$, $i_{30}$, $i_{30a}$ are related to the amplitude of the externally flowing branch current $|i_a|$ of the converter, which flows in the period under consideration. Due to the series connection of the submodules, this current also flows in the branch or valve as connecting current $i_x$. In Table 1 the states have the following meanings Z=1: A state with positive terminal voltage $U_x$, positive terminal current $i_x$ and energy absorption of the storage two-pole 50

Z=2: As Z=1, but with negative terminal current $i_x$ and (as a result) energy delivery of the storage two-pole 50

Z=3: A state with positive terminal voltage $U_x$, positive terminal current $i_x$ and energy delivery of the storage two-pole 50

Z=4: As Z=3, but with negative terminal current $i_x$ and (as a result) energy absorption of the storage two-pole 50

TABLE 1

| Z | $\dfrac{U_x}{U_c}$ | sign $i_x$ | sign $i_c$ | $\dfrac{i_{10}}{|i_a|}$ | $\dfrac{i_{10a}}{|i_a|}$ | $\dfrac{i_{30}}{|i_a|}$ | $\dfrac{i_{30a}}{|i_a|}$ | S |
|---|---|---|---|---|---|---|---|---|
| 1 | +1 | +1 | +1 | −1 | 0 | 0 | −1 | B |
| 2 | +1 | −1 | −1 | +1 | 0 | 0 | +1 | B |
| 3 | −1 | +1 | −1 | 0 | +1 | +1 | 0 | B |
| 4 | −1 | −1 | +1 | 0 | −1 | −1 | 0 | B |

In all states Z=1 to Z=4, the controllable switching device of the storage two-pole 50 is switched into the second activatable switching state, which in the table is characterized by the letter B in the column "S" and in which the store of the storage two-pole can absorb or deliver energy.

In Table 2 the following states are additionally indicated:

Z=5: A state with $U_x=0$ and a positive terminal current $i_x$, and

Z=6: A state with $U_x=0$ and negative terminal current $i_x$

TABLE

| Z | $\dfrac{U_x}{U_c}$ | sign $i_x$ | $\dfrac{i_{10}}{|i_a|}$ | $\dfrac{i_{10a}}{|i_a|}$ | $\dfrac{i_{30}}{|i_a|}$ | $\dfrac{i_{30a}}{|i_a|}$ | S |
|---|---|---|---|---|---|---|---|
| 5 | 0 | +1 | $-\dfrac{1}{2}$ | $+\dfrac{1}{2}$ | $+\dfrac{1}{2}$ | $-\dfrac{1}{2}$ | A |
| 6 | 0 | −1 | $+\dfrac{1}{2}$ | $-\dfrac{1}{2}$ | $-\dfrac{1}{2}$ | $+\dfrac{1}{2}$ | A |

In both states Z=5 and Z=6, the storage two-pole 50 must be switched into the first activatable switching state, in which irrespective of a voltage applied between the first and the second storage two-pole terminal, the storage two-pole delivers no energy. This switching status is marked in the tables by the letter A.

From a control technology point of view, to generate a positive mean value of the terminal voltage $U_x$ in practice, only switching states with $U_x=+U_C$ alternating with those of $U_x=0$ are activated. By analogy, to generate negative mean values only switching states with $U_x=-U_C$ alternating with $U_x=0$ are activated.

Table 3 shows a switching sequence for generating a positive mean value. The sign of the branch current here is assumed to be positive. It turns out that, for each switching operation, essentially only a maximum of half the branch current must be switched by the semiconductors. This fact is advantageous with regard to the resulting switching power loss and the limit value of the semiconductor currents that can be safely switched. Furthermore, it is evident from Table 3 that the currents of semiconductors with negative current direction do not become zero, so that no switching energy losses at all occur in these, in particular no recovery losses as a result of stored charges that must be dissipated. The semiconductor switches 30 and 10a must be actively switched on and off, but—as mentioned above—only at half the current.

TABLE 3

| Z | $\frac{U_x}{U_c}$ | sign $i_x$ | $\frac{i_{10}}{|i_a|}$ | $\frac{i_{10a}}{|i_a|}$ | $\frac{i_{30}}{|i_a|}$ | $\frac{i_{30a}}{|i_a|}$ | S |
|---|---|---|---|---|---|---|---|
| 5 | 0 | +1 | $-\frac{1}{2}$ | $+\frac{1}{2}$ | $+\frac{1}{2}$ | $-\frac{1}{2}$ | A |
| 1 | +1 | +1 | −1 | 0 | 0 | −1 | B |
| 5 | 0 | +1 | $-\frac{1}{2}$ | $+\frac{1}{2}$ | $+\frac{1}{2}$ | $-\frac{1}{2}$ | A |

Table 4 shows the same switching sequence as Table 3, but with a negative current direction of the terminal current $i_x$. The switches 30 and 10a here need not be switched, they can remain always switched off. They can, however, as already explained, also continue to be activated, as in Table 3, despite a negative current direction. A certain degree of switching energy loss does then occur in the storage two-pole 50 however, during the transition from switching state A to B and vice versa at full current amplitude.

TABLE 4

| Z | $\frac{U_x}{U_c}$ | sign $i_x$ | $\frac{i_{10}}{|i_a|}$ | $\frac{i_{10a}}{|i_a|}$ | $\frac{i_{30}}{|i_a|}$ | $\frac{i_{30a}}{|i_a|}$ | S |
|---|---|---|---|---|---|---|---|
| 6 | 0 | −1 | $+\frac{1}{2}$ | $-\frac{1}{2}$ | $-\frac{1}{2}$ | $+\frac{1}{2}$ | A |
| 2 | +1 | −1 | +1 | 0 | 0 | +1 | B |
| 6 | 0 | −1 | $+\frac{1}{2}$ | $-\frac{1}{2}$ | $-\frac{1}{2}$ | $+\frac{1}{2}$ | A |

The semiconductors in the storage two-pole 50 can be designed specifically and differently from the first to fourth semiconductors 10, 10a, 30, 30a, however. In particular, due to the low effective value of the current they can be optimized for rapid, low-loss switching and smaller semiconductor areas. They can also be produced from a semiconductor material with a high band gap, e.g. silicon carbide or gallium nitride, which under the given boundary conditions of the invention is very advantageous.

Tables 5 and 6 show, for the sake of completeness, the analogous operations to Tables 3 and 4 for the case of negative average values of the supply voltage $U_x$.

TABLE 5

| Z | $\frac{U_x}{U_c}$ | sign $i_x$ | $\frac{i_{10}}{|i_a|}$ | $\frac{i_{10a}}{|i_a|}$ | $\frac{i_{30}}{|i_a|}$ | $\frac{i_{30a}}{|i_a|}$ | S |
|---|---|---|---|---|---|---|---|
| 6 | 0 | −1 | $+\frac{1}{2}$ | $-\frac{1}{2}$ | $-\frac{1}{2}$ | $+\frac{1}{2}$ | A |
| 4 | −1 | −1 | 0 | −1 | −1 | 0 | B |
| 6 | 0 | −1 | $+\frac{1}{2}$ | $-\frac{1}{2}$ | $-\frac{1}{2}$ | $+\frac{1}{2}$ | A |

TABLE 6

| Z | $\frac{U_x}{U_c}$ | sign $i_x$ | $\frac{i_{10}}{|i_a|}$ | $\frac{i_{10a}}{|i_a|}$ | $\frac{i_{30}}{|i_a|}$ | $\frac{i_{30a}}{|i_a|}$ | S |
|---|---|---|---|---|---|---|---|
| 5 | 0 | +1 | $-\frac{1}{2}$ | $+\frac{1}{2}$ | $+\frac{1}{2}$ | $-\frac{1}{2}$ | A |
| 3 | −1 | +1 | 0 | +1 | +1 | 0 | B |
| 5 | 0 | +1 | $-\frac{1}{2}$ | $+\frac{1}{2}$ | $+\frac{1}{2}$ | $-\frac{1}{2}$ | A |

With regard to the distribution of the terminal current $i_x$ over the semiconductor switches 10, 10a, 30, 30a, it should be noted that the current distribution in the state changes according to Table 3 through Table 6 can of course only change gradually, i.e. not abruptly. A good circuit design however will only contain small parasitic inductances. In order to limit switching overvoltages, the circuit through the semiconductor switches 10 and 30 and back via the storage two-pole 50, and the circuit through the semiconductor switches 10a, 30a and back via the storage two-pole 50 only contain small parasitic inductances, on average of less than 100 nH.

For the rapid adjustment of the desired current distribution in the semiconductor switches however, in the invention the sum of the parasitic inductances in the circuit formed by the series connection of the semiconductor switches 10, 10a, 30, 30a is the critical factor. Therefore, minimization of the inductance is necessary here by means of an appropriate spatial design of the circuit, and also technically possible. In the high-power range, to obtain a rough orientation the following approximate values may be assumed:

R=forward resistance (in field-effect transistors) approx. 1 mΩ

L=sum of the parasitic inductance approx. 200 nH

This results in a time constant

T=L/4R=200 nH/4 mOhm=50 µs, which the power distribution takes to reach a final value after each switchover of the supply voltage $U_x$. The invention is therefore very well suited to application at the lower switching frequencies of the submodules in modular multi-level converters.

Figure 20:
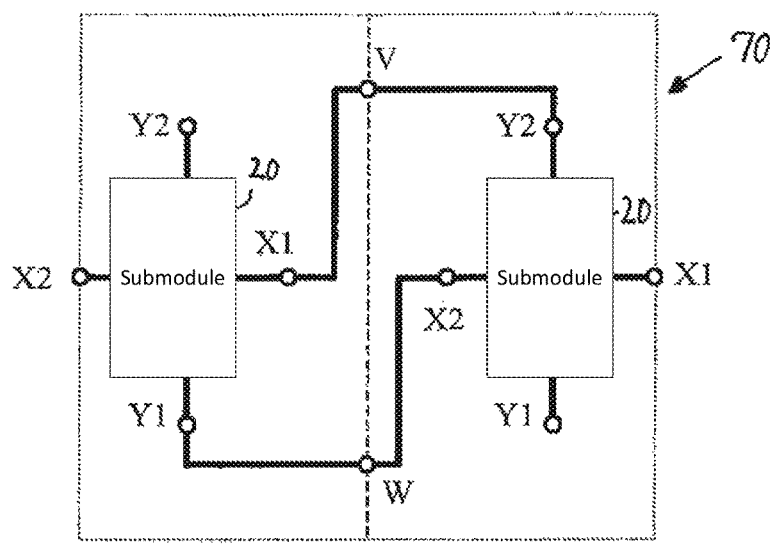
FIG. 20 shows a schematic representation of the interconnection of two submodules according to one of FIGS. 7-12, which are interconnected to form an extended submodule.

FIG. 20 shows an extended submodule 70 which is formed of two submodules 20 of the type described above, which are interconnected as shown in FIG. 20. As can be seen in FIG. 20, the second output X2 of the right-hand submodule 20 in the drawing of FIG. 20 is connected to the first storage two-pole terminal Y1 of the left-hand submodule 20. The first submodule terminal X1 of the left-hand submodule 20 is also connected to the second two-pole terminal Y2 of the right-hand submodule 20. A submodule 70 also designed according to the invention is thus formed, which comprises—as before—a first and a second submodule terminal X1, X2, controllable switches and at least one storage two-pole, but specifically two storage two-poles. This extended submodule 70 is also designated in this disclosure as a "double submodule", because it can be formed from the interconnection of two simpler submodules 20 which are also designed according to the invention. The connections between the submodules 20 of the "double submodule" 70 are labelled in FIG. 20 with the letters V and W. The design of the connections to the connection points V and W can be freely chosen and need not—as for the circuit branches of known semiconductor switches—have extremely low inductance. This enables the said interconnection to be implemented with an advantageous design.

Figure 21:
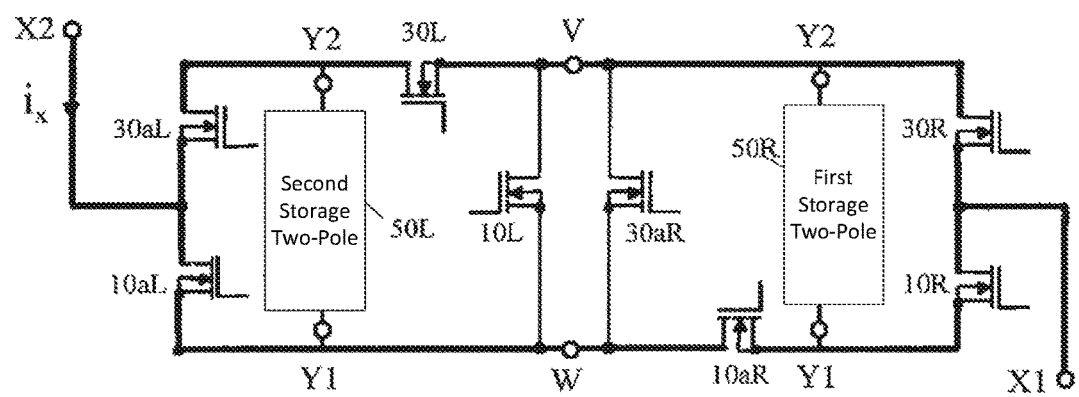
FIG. 21 shows a specific configuration of an extended submodule.

FIG. 21 shows a specific design of such a double submodule 70. The right half of the double submodule 70 in the FIG. 21, comprising first to fourth controllable switches 10R, 30R, 10aR, 30aR and a first storage two-pole 50R, corresponds to the submodule of FIG. 11, wherein in the selected representation the first terminal X1 is on the right in FIG. 21 and on the left in FIG. 11. The left half of the double submodule 70 of FIG. 21, comprising fifth to eighth switches 10L, 30L, 10aL and 30aL and a second storage two-pole 50L, also corresponds to the submodule 20 of FIG. 11, and the two submodules are interconnected as shown in FIG. 20: the second submodule terminal X2 of the right-hand submodule, which corresponds to the connection point W of FIG. 21, is connected to the first two-pole terminal Y1 of the second storage two-pole 50L, and the first submodule terminal X1 of the left-hand submodule, which corresponds to the connection point V, is connected to the second two-pole terminal Y2 of the first storage two-pole 50R. It is evident that the fourth and the fifth switch 30aR, 10L are connected directly in parallel. Therefore, one of the two switches 30aR, 10L can also be omitted, so that the extended submodule 70 can also be realized with only seven switches.

The first and second storage two-pole 50R, 50L can be of the same type, as was previously described with reference to FIGS. 13-17. In particular, both storage two-poles 50R, 50L have a switching device (not shown), which has the said first activatable switching state (state A), in which the respective storage two-pole 50R, 50L delivers no energy irrespective of a voltage applied between the first and the second storage two-pole terminal Y1 and Y2, and a second activatable switching state (B), in which the store of the storage two-pole 50R, 50L can absorb or deliver energy.

It is stressed that the module 70, although designated as a "double submodule" and in fact is assembled from two submodules according to the invention, in turn forms a submodule according to the invention, which in its entirety only has one first submodule terminal X1 (on the right in FIG. 21) and one second submodule terminal X2 (on the left in FIG. 21).

The fact that this submodule 21 can be built from two simple submodules according to the invention, however, represents a major advantage, because it can be configured as a double submodule from two submodules according to the invention directly and without any modifications. Also of importance is the fact that the additional loss reduction can be achieved without the disadvantages and limitations that were discussed above in connection with document DE 10 2009 057 288 A1 or the doctoral thesis by K. Ilves. In particular, the problems associated with the parallel connection of the storage capacitors of the "semi-full-bridge submodules" discussed earlier, which would considerably limit the free deployment of the energy storage devices, do not occur, because short-circuit-type equalizing currents, such as would occur in a parallel connection of capacitors, can be avoided.

Only the limitation of the maximum value of the negative voltage known from DE 10 2009 057 288 A1 remains restrictive, but this is tolerable in the major application areas of the modular multilevel converters.

In the double submodule of FIG. 21, each of the two storage two-poles 50R, 50L can be energized irrespective of the direction of the current $i_x$, i.e. switched into the second activatable switching state B, or into the first activatable switching state (A), in which the respective storage two-pole 50R, 50L delivers no energy. This in particular avoids a situation where both storage two-poles 50R, 50L exchange energy among each other in an uncontrolled manner by short-circuit-type equalizing currents whereby large proportions of the energy are inherently converted into heat.

The following table shows the switching states Z of the double submodule 70 of FIG. 21. The number of the states is composed of a first digit, which indicates the state of the left-hand submodule, and a second digit, which indicates the state of the right-hand submodule. The meaning of the individual digits 1 to 6 continues to apply as summarized in Tables 1 and 2. The specified current distribution may vary slightly, depending on the forward characteristic of the semiconductors. In particular, the current distribution in the states 15, 26 and 51, 62 can differ slightly from the factors ½ and ¼, but without any major practical importance.

| Z | $\dfrac{U_{xL}}{U_c}$ | $\dfrac{U_{xR}}{U_c}$ | sign $i_x$ | $\dfrac{i_{10L}}{|i_a|}$ | $\dfrac{i_{10aL}}{|i_a|}$ | $\dfrac{i_{30L}}{|i_a|}$ | $\dfrac{i_{30aL}}{|i_a|}$ | $S_L$ | $\dfrac{i_{10R}}{|i_a|}$ | $\dfrac{i_{10aR}}{|i_a|}$ | $\dfrac{i_{30R}}{|i_a|}$ | $\dfrac{i_{30aR}}{|i_a|}$ | $S_R$ |
|---|---|---|---|---|---|---|---|---|---|---|---|---|---|
| 11 | +1 | +1 | +1 | −½ | 0 | 0 | −1 | B | −1 | 0 | 0 | −½ | B |
| 22 | +1 | +1 | −1 | +½ | 0 | 0 | +1 | B | +1 | 0 | 0 | +½ | B |
| 35 | −1 | 0 | +1 | 0 | +1 | +1 | 0 | B | 0 | 0 | +1 | 0 | A |
| 46 | −1 | 0 | −1 | 0 | −1 | −1 | 0 | B | 0 | 0 | −1 | 0 | A |
| 55 | 0 | 0 | +1 | 0 | +½ | +½ | −½ | A | −½ | +½ | +½ | 0 | A |
| 66 | 0 | 0 | −1 | 0 | −½ | −½ | +½ | A | +½ | −½ | −½ | 0 | A |
| 15 | +1 | 0 | +1 | −¼ | 0 | 0 | −1 | B | −½ | +½ | +½ | −¼ | A |
| 26 | +1 | 0 | −1 | +¼ | 0 | 0 | +1 | B | +½ | −½ | −½ | +¼ | A |
| 53 | 0 | −1 | +1 | 0 | +1 | 0 | 0 | A | 0 | +1 | +1 | 0 | B |
| 64 | 0 | −1 | −1 | 0 | −1 | 0 | 0 | A | 0 | −1 | −1 | 0 | B |
| 51 | 0 | +1 | +1 | −¼ | +½ | +½ | −½ | A | −1 | 0 | 0 | −¼ | B |
| 62 | 0 | +1 | −1 | +¼ | −½ | −½ | +½ | A | +1 | 0 | 0 | +¼ | B |

The double submodule 70 of FIG. 21 in its application in a modular multilevel converter enables a further loss reduction of typically 20-25% while having—apart from the lower negative maximum voltage—no technically significant limitations on the function.

The features of the invention disclosed in the description, the claims and the drawings can be essential to the implementation of the invention both individually and in any desired combination.

The invention claimed is:

1. A converter, comprising a plurality of controllable two-pole submodules connected in series,
   wherein at least some of the said submodules each comprise the following:
   a first and a second submodule terminal,
   a first, a second, a third and a fourth controllable switch, and a first storage two-pole, which comprises a first and a second two-pole terminal, an energy store and a controllable switching device, wherein the controllable switching device has a first activatable switching state, in which the first storage two-pole delivers no energy irrespective of a voltage applied between the first and the second terminal of said storage two-pole, and a second activatable switching state, in which the energy store of the first storage two-pole can absorb or deliver energy, wherein each submodule among said at least some submodules as a whole has an activatable transmission state, in which the controllable switching device of the first storage two-pole occupies the said first switching state, and the first to the fourth controllable switches are connected in such a way that a current flows through the submodule on two parallel branches, wherein the converter also comprises a control unit, which is configured to control the controllable switches of the sub-module and the controllable switching device of the first storage two-pole, the control unit being configured to switch selected submodules among said at least some submodules selectively into the transmission state;

wherein each submodule among said at least some submodules also has one or more of the following four activatable energy delivery or energy-absorbing states, in which in each case the controllable switching device of the first storage two-pole occupies the said second switching state, and the voltage between the second and the first submodule terminal is positive and the energy store of the first storage two-pole is charged, or the voltage between the second and the first submodule terminal is positive and the energy store of the first storage two-pole is discharged, or the voltage between the second and the first submodule terminal is negative and the energy store of the first storage two-pole is discharged, or the voltage between the second and the first submodule terminal is negative and the energy store of the first storage two-pole is charged.

2. The converter according to claim 1, in which one or more of the first to the fourth controllable switches is or are formed by power semiconductors, in particular by IGBTs or thyristors, in particular GTO thyristors.

3. The converter according to claim 1, in which one or more of the first to the fourth controllable switches is or are formed by reverse-conducting power semiconductors.

4. The converter according to claim 1, in which one or more of the first to the eighth controllable switches have a reversed freewheeling diode connected in parallel.

5. The converter according to claim 1, in which the control unit is configured to switch one or more of the first to fourth controllable switches into conduction also in switching states in which a current flows in the opposite direction to this switch.

6. The converter according to claim 1, in which the controllable switching device of the first storage two-pole comprises at least one semiconductor switch, the percentage power loss of which is less than that of the first to fourth controllable switches.

7. The converter according to claim 1, in which the controllable switching device of the first and/or second storage two-pole comprises at least one SiC-switch or at least one GaN-switch.

8. The converter according to claim 1, in which the controllable switching device of the first and/or second storage two-pole contains a plurality of semiconductor switches connected in series.

9. The converter according to claim 1, in which the energy store of the first storage two-pole comprises at least one capacitor, in particular a unipolar capacitor.

10. The converter according to claim 9, in which the first storage two-pole contains or contain at least two capacitors, which are or can be connected in series.

11. The converter according to claim 10, in which the at least two capacitors can be connected in parallel for charging and in series for discharging.

12. A converter, comprising a plurality of controllable two-pole submodules connected in series, wherein at least some of the said submodules each comprise the following:

a first and a second submodule terminal, a first storage two-pole, which comprises a first and a second two-pole terminal, an energy store and a controllable switching device, a first, a second, a third and a fourth controllable switch, wherein the first and second controllable switches are connected in series, the third and fourth controllable switches are connected in series, and the series connection consisting of the first and second controllable switches, the series connection consisting of the third and fourth controllable switches, and the first storage two-pole are connected in parallel;

wherein the controllable switching device has a first activatable switching state, in which the first storage two-pole delivers no energy irrespective of a voltage applied between the first and the second terminal of said storage two-pole, and a second activatable switching state, in which the energy store of the first storage two-pole can absorb or deliver energy, wherein each submodule among said at least some submodules as a whole has an activatable transmission state, in which the controllable switching device of the first storage two-pole occupies the said first switching state, and the first to the fourth controllable switches are connected in such a way that a current flows through the submodule on two parallel branches, wherein the converter also comprises a control unit, which is configured to control the controllable switches of the sub-module and the controllable switching device of the first storage two-pole, the control unit being configured to switch selected submodules among said at least some submodules selectively into the transmission state.

13. The converter according to claim 12, in which a potential point between the first and the second controllable switches is connected to the first submodule terminal and a potential point between the third and fourth controllable switches is connected to the second submodule terminal.

14. The converter according to claim 12, in which the first and second controllable switches are oriented in the same direction with regard to their forward direction and the third and fourth controllable switches are oriented in the same direction with regard to their forward direction.

15. The converter according to claim 14, in which with regard to their forward direction, the first and second controllable switches are oriented in the opposite direction to the third and fourth controllable switches in the direction along the loop.

16. A converter, comprising a plurality of controllable two-pole submodules connected in series,
wherein at least some of the said submodules each comprise the following:
a first and a second submodule terminal,
a first, a second, a third and a fourth controllable switch, and
a first storage two-pole, which comprises a first and a second two-pole terminal, an energy store and a controllable switching device, wherein the controllable switching device has a first activatable switching state, in which the first storage two-pole delivers no energy irrespective of a voltage applied between the first and the second terminal of said storage two-pole, and
a second activatable switching state, in which the energy store of the first storage two-pole can absorb or deliver energy,
wherein each submodule among said at least some submodules as a whole has an activatable transmission state, in which
the controllable switching device of the first storage two-pole occupies the said first switching state, and
the first to the fourth controllable switches are connected in such a way that a current flows through the submodule on two parallel branches, wherein the converter also comprises a control unit, which is configured to control the controllable switches of the sub-module and the controllable switching device of the first storage two-pole, the control unit being configured to switch selected submodules among said at least some submodules selectively into the transmission state;
wherein said at least some of the said submodules further comprise the following:
a fifth, sixth, seventh and eighth controllable switch, wherein the fifth controllable switch is connected directly in parallel with the fourth controllable switch and can optionally be omitted, and
a second storage two-pole, which comprises a first and a second two-pole terminal, an energy store and a controllable switching device, wherein the controllable switching device
has a first activatable switching state, in which the second storage two-pole delivers no energy irrespective of a voltage applied between the first and second terminal of the second storage two-pole, and
a second activatable switching state, in which the enemy store of the second storage two-pole can absorb or deliver energy,
wherein each submodule among said at least some of the submodules as a whole has an activatable transmission state, in which
the controllable switching device of the first and second storage two-pole occupy the said first switching state, and
the first to eighth controllable switches are connected in such a way that a current flows through the submodule on two parallel branches.

17. The converter according to claim 16, in which the fifth and sixth controllable switches are connected in series, the seventh and eighth controllable switches are connected in series, and the series connection consisting of the fifth and the sixth controllable switches, the series connection consisting of the seventh and eighth controllable switches and the second storage two-pole are connected in parallel.

18. The converter according to claim 16, in which a potential point between the first and the second controllable switches is connected to the first submodule terminal, a potential point between the third and fourth controllable switches is connected to the first terminal of the second storage two-pole,
a potential point between the fifth and the sixth controllable switches is connected to the second terminal of the first storage two-pole, and a potential point between the seventh and eighth controllable switches is connected to the second submodule terminal.

19. The converter according to claim 16, in which the fifth and sixth controllable switches are oriented in the same direction with regard to their forward direction and the seventh and eighth controllable switches are oriented in the same direction with regard to their forward direction.

20. The converter according to claim 19, in which with regard to their forward direction the fifth and sixth controllable switches are oriented in a closed loop circuit in the opposite direction to the seventh and eighth controllable switches.

21. The converter according to claim 1, 12, or 16 wherein the converter has a plurality of branches consisting of submodules connected in series, each branch having at least 3 of the said at least some submodules.

22. A module comprising:
a first and a second module terminal,
a first, a second, a third and a fourth controllable switch, wherein the first and second controllable switches are connected in series, the third and fourth controllable switches are connected in series, and the series connection consisting of the first and second controllable switches, the series connection consisting of the third and fourth controllable switches, and the first storage two-pole are connected in parallel; and
a first storage two-pole, which comprises a first and a second two-pole terminal, an energy store and a controllable switching device, wherein the controllable switching device
has a first activatable switching state, in which the first storage two-pole delivers no energy irrespective of a voltage applied between the first and the second storage two-pole terminal, and
has a second activatable switching state, in which the energy store of the storage two-pole can absorb or deliver energy,
wherein the module as a whole has an activatable transmission state, in which
the controllable switching device of the first storage two-pole occupies the said first switching state, and
the first to fourth controllable switches are connected in such a way that a current flows through the submodule on two parallel branches.

23. A module, comprising:
a first and a second module terminal,
a first, a second, a third and a fourth controllable switch, and
a first storage two-pole, which comprises a first and a second two-pole terminal, an energy store and a controllable switching device, wherein the controllable switching device
has a first activatable switching state, in which the first storage two-pole delivers no energy irrespective of a voltage applied between the first and the second storage two-pole terminal, and
has a second activatable switching state, in which the energy store of the storage two-pole can absorb or deliver energy,
wherein the module as a whole has an activatable transmission state, in which the controllable switching device of the first storage two-pole occupies the said first switching state, and the first to fourth controllable switches are connected in such a way that a current flows through the submodule on two parallel branches, a fifth, sixth, seventh and eighth controllable switch, wherein the fifth controllable switch is connected directly in parallel with the fourth controllable switch and can optionally be omitted, and a second storage two-pole, which comprises a first and a second two-pole terminal, an energy store and a controllable switching device, wherein the controllable switching device has a first activatable switching state, in which the second storage two-pole delivers no energy irrespective of a voltage applied between the first and terminal of the second storage two-pole, and has a second activatable switching state, in which the energy store of the second storage two-pole can absorb or deliver energy, wherein the module as a whole has an activatable transmission state, in which the controllable switching device of the first and second storage two-pole occupy the said first switching state, and the first to eighth controllable switches are connected in such a way that a current flows through the submodule on two parallel branches.

24. A method for controlling a converter, which contains a plurality of controllable submodules connected in series, wherein at least some of the said submodules each comprise the following:

a first and a second submodule terminal, a first, a second, a third and a fourth controllable switch, and a storage two-pole, which comprises a first and a second two-pole terminal, an energy store and a controllable switching device, wherein the controllable switching device has a first activatable switching state, in which the first storage two-pole delivers no energy irrespective of a voltage applied between the first and the terminal of the storage two-pole, and has a second activatable switching state, in which the energy store of the storage two-pole can absorb or deliver energy, wherein the controllable switches and the controllable switching device of the storage two-pole of at least one submodule are switched at least temporarily into an activatable conduction state, in which the controllable switching device of the storage two-pole occupies the said first switching state, and the first to fourth controllable switches are connected in such a way that a current flows through a given one of said at least some of said submodules on two parallel branches;

wherein each of said at least some submodules has one or more of the following four activatable energy delivery or energy-absorbing states, in which in each case the controllable switching device of the first storage two-pole occupies the said second switching state, and the voltage between the second and the first submodule terminal is positive and the energy store of the first storage two-pole is charged, or the voltage between the second and the first submodule terminal is positive and the energy store of the first storage two-pole is discharged, or the voltage between the second and the first submodule terminal is negative and the energy store of the first storage two-pole is discharged, or the voltage between the second and the first submodule terminal is negative and the energy store of the first storage two-pole is charged, and wherein said method comprises controlling said converter such that at least one of said at least some submodules acquires one of said for activatable energy delivery or energy absorbing states.

* * * * *